United States Patent [19]

Harvey

[11] 4,397,535
[45] Aug. 9, 1983

[54] FILM THREADING APPARATUS
[75] Inventor: Donald M. Harvey, Webster, N.Y.
[73] Assignee: Eastman Kodak Company, Rochester, N.Y.
[21] Appl. No.: 339,262
[22] Filed: Jan. 13, 1982

Related U.S. Application Data

[63] Continuation-in-part of Ser. No. 186,772, Sep. 12, 1980, abandoned.

[51] Int. Cl.³ .............................................. G03B 1/20
[52] U.S. Cl. ..................................... 354/212; 354/173
[58] Field of Search .............................. 354/170–173, 354/204–206, 212–216; 242/71.1

[56] References Cited

U.S. PATENT DOCUMENTS

| | | |
|---|---|---|
| 3,463,071 | 8/1969 | Winkler et al. ...................... 354/212 |
| 3,465,658 | 9/1969 | Hackenberg ........................ 354/212 |
| 3,481,260 | 12/1969 | Ettischer et al. .................... 354/212 |
| 3,581,640 | 6/1971 | Kimura . | 
| 3,638,547 | 2/1972 | Sekida ................................ 354/212 |
| 4,222,648 | 9/1980 | Beaver ................................ 354/171 |

Primary Examiner—John Gonzales
Attorney, Agent, or Firm—Roger A. Fields

[57] ABSTRACT

In a camera, a film threading apparatus operates to feed a film leader extending out of a film cassette from a supply chamber to a take-up chamber. The film cassette is loaded in the supply chamber with the film leader positioned in a film passageway between the supply and take-up chambers. A film threading member is located adjacent the leader, with a non-film engagable section of the threading member confronting, though spaced from the leader. When a camera door is closed, a drive mechanism causes the threading member to be revolved, moving a film engagable section of the threading member to engage and advance the film leader to a film capturing mechanism in the take-up chamber. The threading member is stopped with its non-engagable section again confronting the film leader to prevent the threading member from interfering with subsequent film advance.

6 Claims, 11 Drawing Figures

FILM THREADING APPARATUS

REFERENCE TO FIRST APPLICATION

This is a continuation-in-part of application Ser. No. 186,772, filed Sept. 12, 1980, abandoned.

BACKGROUND OF THE INVENTION

1. Field of the Invention

The invention generally relates to film advancing means in photographic cameras, and more particularly to apparatus for threading a film leader from a film cassette onto a take-up core in the camera.

2. Description of the Prior Art

Cameras provided with film threading apparatus are well known to those familiar with the photographic art. For example, U.S. Pat. No. 3,463,071, issued to Winkler on Aug. 26, 1969, discloses one type of film threading apparatus for a 35 mm still camera. In the camera, the threading apparatus consists of a guide member for directing a film leader, extending from a film cassette, toward a take-up core and a plurality of leaf springs for securing the leader to the take-up core. A conventional metering sprocket is used to drive the film leader past the guide member toward the take-up core and to prevent lateral misalignment of the leader with the leaf springs. While this structure is generally reliable, the need to position the film leader on the metering sprocket requires operator involvement and prevents threading from being fully automatic.

SUMMARY OF THE INVENTION

The invention is directed to film threading apparatus which reliably advances a film leader from a film cassette to film capturing means in a photographic camera, and can do so with little or no operator involvement.

In keeping with the teachings of the invention, there is provided in a photographic camera of the type having (a) a supply chamber for receiving a film cassette, (b) a take-up chamber spaced from the supply chamber, (c) a passageway located between the two chambers for receiving a film leader extending from the cassette, and (d) means in the take-up chamber for capturing the leader, the improvement comprising:

a film threading member having an outer continuous surface including a film engagable section and a non-film engagable section, the threading member being revolvable to alternately position its film engagable section in the passageway and its non-film engagable section opposite the passageway; and means, coupled with the threading member, for first revolving the threading member to move its film engagable section for engaging and advancing film leader to the capturing means, and for then terminating revolution of the threading member with its non-film engagable section opposite the passageway. Further advancement of the film from the cassette can then be accomplished by conventional take-up means in the take-up chamber, with the threading member out of engagement with the film.

According to the invention, the film threading member may comprise either of the following:

(1) a rotatable roller having an outer continuous surface including a film engagable section that is generally curved and a non-film engagable section that is substantially flat or relieved;

(2) a rotatable sprocket wheel having an outer continuous surface including a film engagable section that has a series of teeth for engaging respective sprocket holes in the film leader and a non-film engagable section that is devoid of any teeth; or (3) an endless belt having an outer continuous surface including a film engagable section that has a series of teeth for engaging respective sprocket holes in the film leader and a non-film engagable section that is devoid of any teeth.

DESCRIPTION OF THE PREFERRED EMBODIMENTS

Because photographic still cameras and film cassettes are well known, this description will be directed to elements forming part of, or cooperating directly with, apparatus in accordance with the invention. It is to be understood, however, that other elements not specifically shown or described may take various forms well known to those having ordinary skill in the art.

Figure 1:
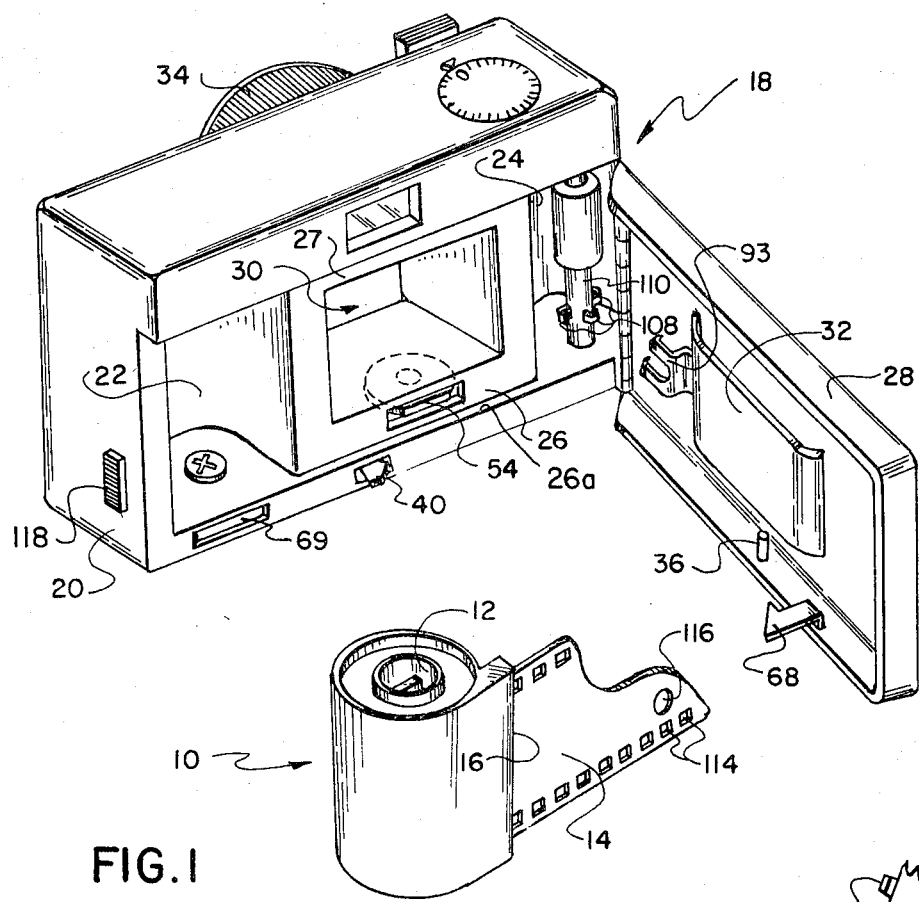
FIG. 1 is a perspective view of a photographic still camera incorporating one embodiment of film threading apparatus according to the invention and of a film cassette to be loaded in the camera.

Referring now to the drawings, a film cassette 10, containing a roll of film coiled upon a spool 12 and having an elongated film leader 14 extending out of a light-tight slot 16, is shown in FIG. 1 in position for loading into a still camera 18. The camera 18 includes a body portion 20 having a film supply chamber 22 and a film take-up chamber 24 located at opposite ends of a pair of film guide rails 26 and 27. A camera cover door 28 is hinged to the camera body 20 in a conventional manner. The two guide rails 26 and 27 define a film passageway 30 extending lengthwise between the supply and take-up chambers and, in conjunction with a spring biased pressure plate 32 mounted on the interior of the camera door 28, maintain the film in a flat, properly oriented position in the focal plane of a camera objective lens 34.

To load the camera, the film cassette 10 is inserted into the film supply chamber 22 with the film leader 14 lying along the guide rails 26 and 27. Then, the cover door 28 is closed.

Figure 2:
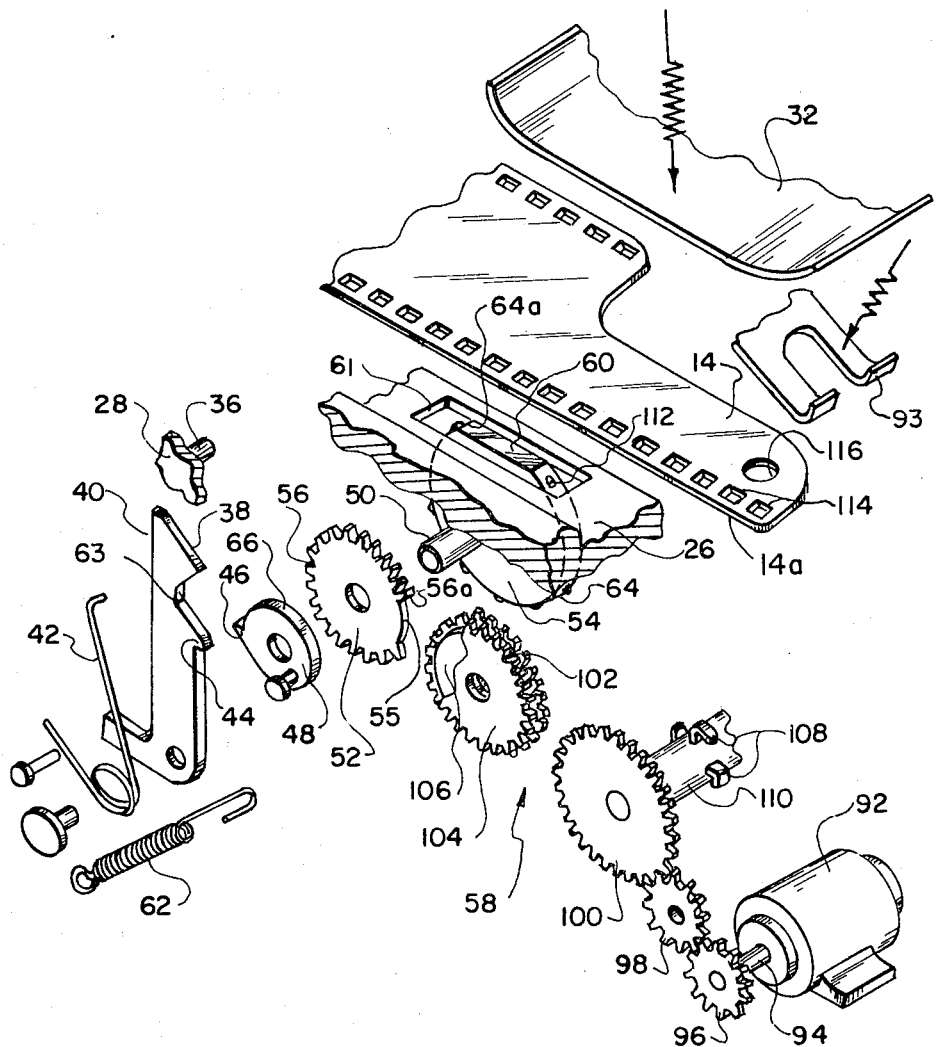
FIG. 2 is an exploded view of the film threading apparatus shown in FIG. 1.
Figure 3A:
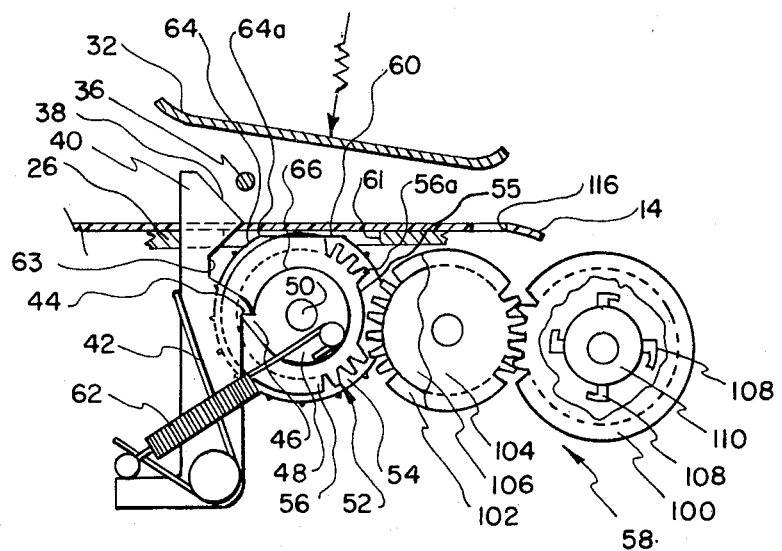
FIGS. 3A–3D are schematic side views illustrating respective positions of the film threading apparatus and a film leader during the threading operation.
Figure 3B:
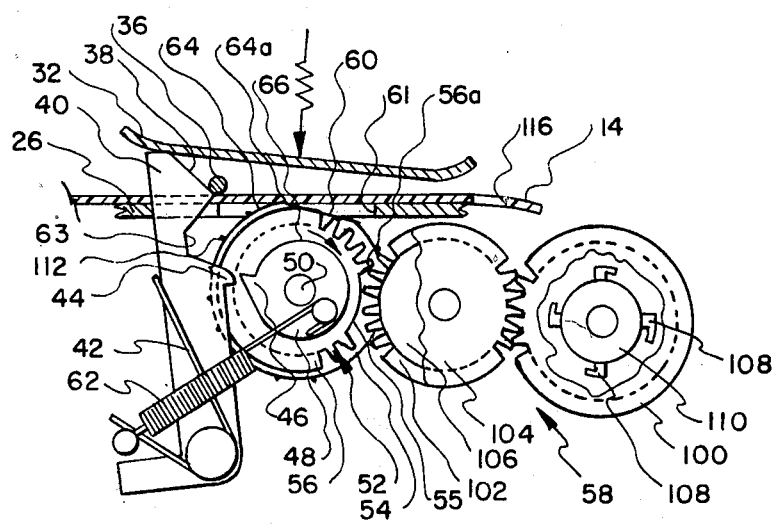

In a motor driven embodiment of the invention, illustrated in FIGS. 1–3D, a pin 36 mounted on the interior of the cover door 28 first engages a cam surface 38 of a pivotable pawl 40, as the door 28 closes, and then rotates the pawl momentarily in a counterclockwise direction against the bias of a spring 42, as viewed in FIG. 3B. The counterclockwise rotation of the pawl 40 withdraws a pawl arm 44 from a tooth 46 of a pawl wheel 48 fixedly mounted on a shaft 50. A film threading member, such as a threading roller 54, and a mutilated index gear 52 having a relieved portion 55 and a gear segment 56, are fixedly mounted on the shaft 50. In a latched position of the pawl wheel 48, the index gear 52 and the threading roller 54 are held in respective positions, shown in FIG. 3A. The index gear 52 is disposed with its relieved portion 55 adjacent a drive transmission mechanism 58 and the threading roller 54, which extends into a film guide rail slot 61, is disposed with an outer, generally flat, surface portion 60 of the roller confronting and spaced opposite from an edge portion 14a of the film leader 14. The withdrawal of the pawl arm 44 from the tooth 46 of the pawl wheel 48 allows a spring 62 to rotate the pawl wheel, the index gear 52, and the threading roller 54 about the shaft 50 in a clockwise direction, as viewed in FIG. 3B. Rotation of the gear 52 causes a leading edge 56a of the gear segment 56 to be brought into engagement with the drive transmission mechanism 58. Rotation of the threading roller 54 causes a leading edge 64a of an outer, generally cylindrical, surface portion 64 of the roller to be brought into frictional engagement with the edge portion 14a of the film leader 14. Rotation of the pawl wheel 48 as the pin 36 moves past the cam surface 38 and into a notch 63, causes the pawl 44 to pivot in a clockwise direction and ride upon a generally cylindrical cam surface 66, as viewed in FIG. 3C.

Figure 3C:
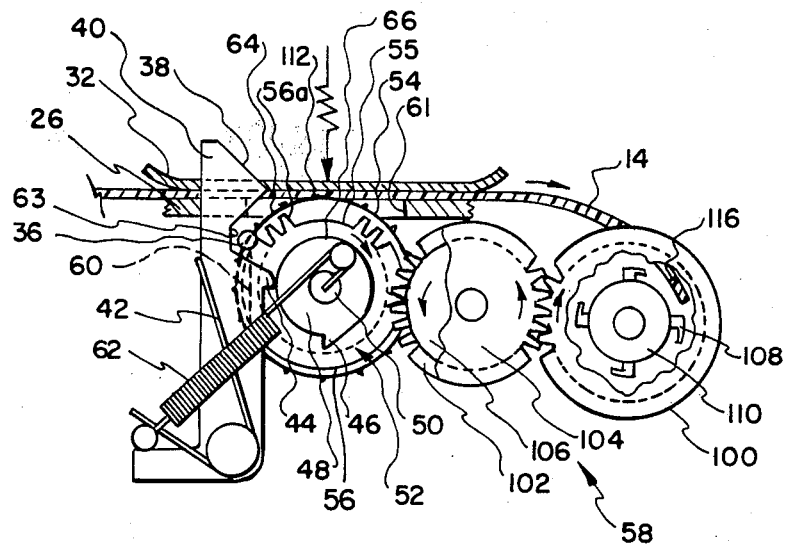
Figure 3D:
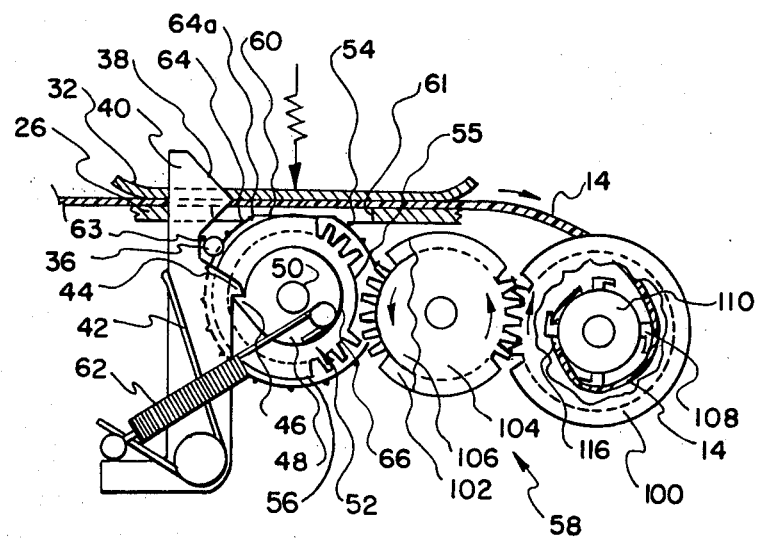

When the cover door 28 is closed, a cover door latch lever 68 enters a slot 69 in the camera body portion 20 and closes a motor drive switch (not shown). The closing of the motor drive switch energizes a motor 92 having an output shaft 94 connected to the drive transmission mechanism 58 via a drive gear 96, as shown in FIG. 2. The transmission mechanism 58 comprises a drive train gears 98, 100, 102, and 104 and a friction clutch 106, interposed between the gears 102 and 104, and transmits the drive of the motor 92 to the gear segment 56 of the index gear 52. As shown in FIGS. 3C and 3D, the coupling of the drive power from the motor 92 to the gear segment 56 causes the index gear 52, the pawl wheel 48, and the threading roller 54 to rotate through one revolution.

During the rotation of the threading roller 54 by the motor 92, the frictional engagement between the roller's cylindrical outer surface portion 64 and the edge portion 14a of the film leader 14 advances the film leader past a film guide member 93, into the take-up chamber 24, and into engaging relationship with film capturing means, for example, one of a plurality of film capturing posts 108, shown in FIG. 1. The film capturing posts 108 are positioned at equally spaced intervals about the periphery of a film take-up spool 110 rotatably mounted within the take-up chamber. As shown in FIG. 3D, when the index gear 52 completes one revolution, the gear segment 56 disengages from the drive train gear 104, the pawl arm 44 re-engages the tooth 46, and the threading roller 54 is held stationary with its flat outer surface portion 60 again positioned as it was initially, i.e., confronting and spaced from the edge portion 14a of the film leader 14.

To assist in the advancement of the film leader 14, the threading roller 54 may be made of a soft, high friction material such as polyurethane and is provided at equally spaced intervals around its cylindrical outer surface portion 64 with a plurality of protuberances 112 which enter into respective sprocket holes 114 along the edge portion 14a of the film leader 14. Film advancement is thus achieved by a combination of (1) friction between the roller's cylindrical outer surface portion 64 and the edge portion 14a of the film leader 14 and (2) the engagement of the leading edge of the protuberances 112 with the leading edge of the sprocket holes 114. The film threading roller 54 is canted at a slight angle, preferably, about 5°, with respect to the film guide rail 26 to laterally urge the film leader 14 against a longitudinal edge 26a of that guide rail, thereby assuring lateral alignment of the film leader with the film capturing posts 108.

The transmission mechanism 58 transmits the drive of the motor 92 to the take-up spool 110 via the drive train gear 100, which is fixedly connected to the take-up spool. The gear tooth ratio between the gear segment 56 and the take-up spool gear 100 and the effective diameters of the threading roller 54 and the take-up spool 110 are selected so that the film advancing velocity imparted to the film capturing posts 108 is greater than the film advancing velocity imparted to the film leader 14. This film advancing velocity difference first enables one of the film capturing posts 108 to secure the film leader 14 to the take-up spool 110 by entering an aperture 116 provided near the leading edge of the film leader and then tensions the film leader between the one capturing post and the threading roller 54. When the film leader 14 is properly tensioned, the clutch 106 allows slippage between the drive gears 102 and 104 of the transmission mechanism 58 during the time required for the gear segment 56 to complete its engagement with the drive gear 104. The trailing edges of the protuberances 112 on the cylindrical outer surface portion 64 of the threading roller 54 are slanted to permit the film leader 14 to disengage from the protuberances and to slide in an overrunning fashion between the roller's outer surface portion and the pressure plate 32.

From the foregoing it can be seen that each time the camera cover door 28 is closed, the threading roller 54 is driven for one revolution to advance the film leader 14 to the camera take-up spool 110 for engagement of the film leader by one of the film capturing posts 108. Then, the threading roller 54 is held stationary and out of engagement with the film during its further advancement by the motor 92 for exposure purposes and during rewinding of the film by means (not shown) back into the film cassette 10. To remove the film from the camera 18, the operator depresses a release button 114 which disengages the cover door latch 68 permitting the cover door 28 to be swung open.

Figure 6:
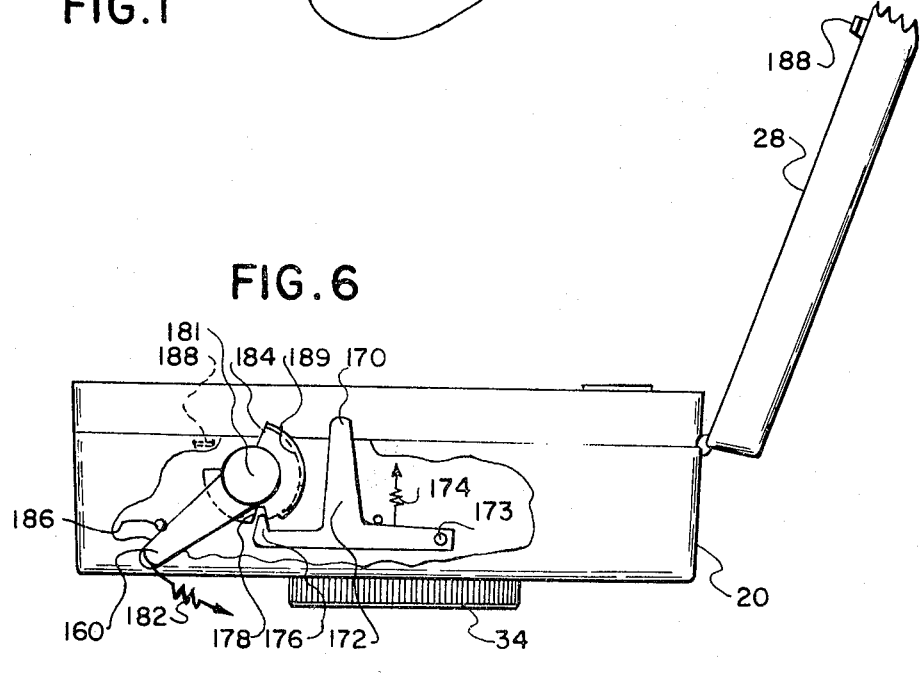
FIG. 6 is a bottom view of the camera shown in FIG. 4, with portions cut away to illustrate a drive actuation mechanism of the film threading apparatus shown in FIG. 5.
Figure 4:
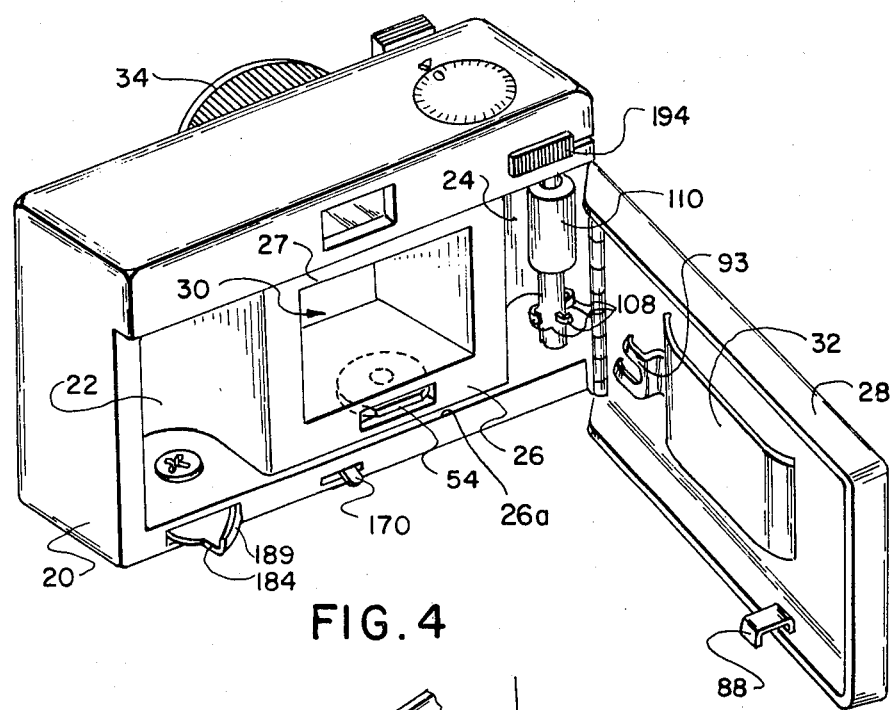
FIG. 4 is a perspective view of a photographic still camera incorporating a second embodiment of film threading apparatus according to the invention.
Figure 5:
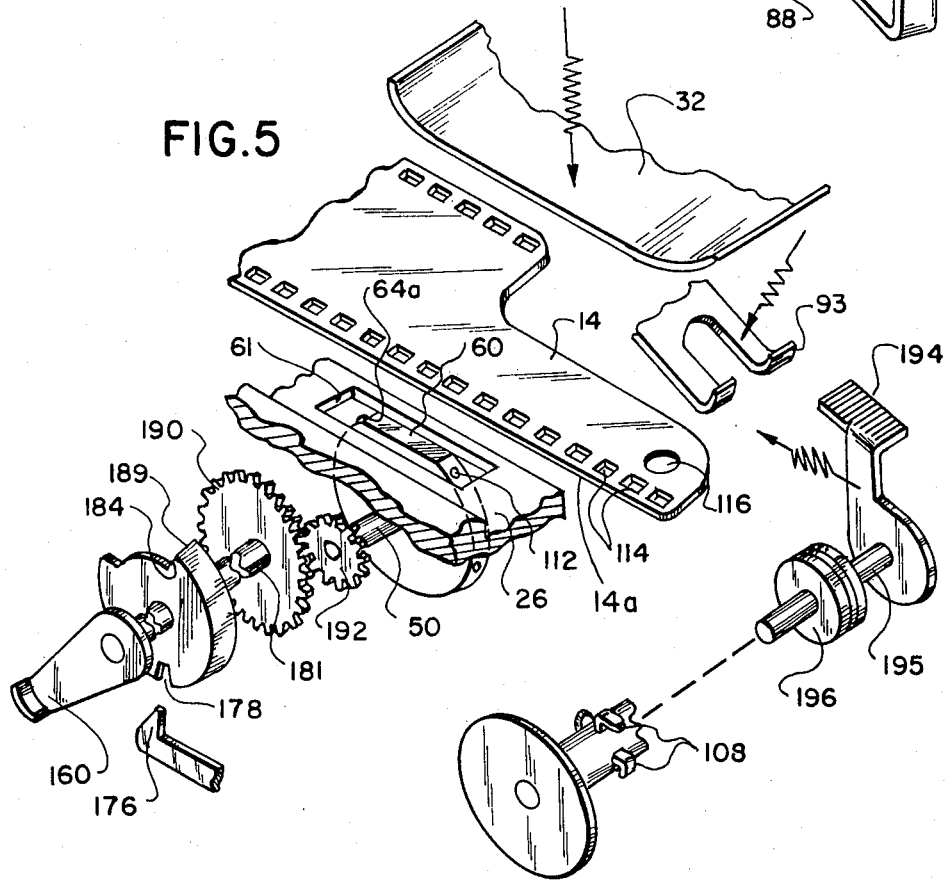
FIG. 5 is an exploded view of the film threading apparatus shown in FIG. 4.

FIGS. 4-6 illustrate a manual embodiment of the invention in which the drive power for initiating the rotation of the threading roller 54 to advance the film leader 14 into the take-up chamber 24 is provided by a manually operated cover door latch lever 160. For ease in understanding this second embodiment, parts identical to those in the first embodiment are identified by like reference numerals.

In the second embodiment the cover door 28, upon closing, engages an upwardly extending finger 170 of a lock lever 172 and rotates the lever counterclockwise about a pivot 173 against the bias of a spring 174, as viewed in FIG. 6, thereby withdrawing an ear 176 from a slot 178 in the cover door latch lever 160. When the ear 176 is withdrawn from the slot 178, a spring 182 rotates the latch lever 160 about a shaft 181 in a counterclockwise direction from an unlatched position, shown in FIG. 6, to a latched position in which an abutment surface 184 rests against a stop 186. During the movement of the latch lever 160 from its unlatched to its latched position, a turned-up lip 189 on the lever 160 slides over a cover door latch 188. This locks the cover door 28 and the camera body 20 in a light-tight manner.

As shown in FIG. 5, the cover door latch lever 160 is coupled to the threading roller 54 via a gear 190 fixedly mounted on the shaft 181 and meshing with a gear 192 fixedly mounted on the shaft 50. The counterclockwise rotation imparted to the latch lever 160 by the spring 182 causes the gear 190 to rotate approximately 120° and the gear 192 and the threading roller 54 to rotate through one complete revolution. The single revolution of the threading roller 54 transports the film leader 14 to the take-up chamber 24 and into engagement with one of the film capturing posts 108 in the manner described above.

During advancement of the film for exposure purposes, by means of a conventional film winding mechanism 194 which is coupled to the take-up spool 110 via a shaft 195 and a slip clutch 196, the threading roller 54 is held stationary and out of engagement with the film. To remove the film from the camera, the film is first rewound by means (not shown) back into the film cassette 10. The camera operator then rotates the latch lever 160 in a clockwise direction, as viewed in FIG. 6, against the bias of spring 182 until the ear 176 of the lock lever 172 enters the slot 178. During this clockwise rotation, the latch lever lip 189 disengages from the cover door latch 188 permitting the cover 28 to be swung to its open position.

Figure 7:
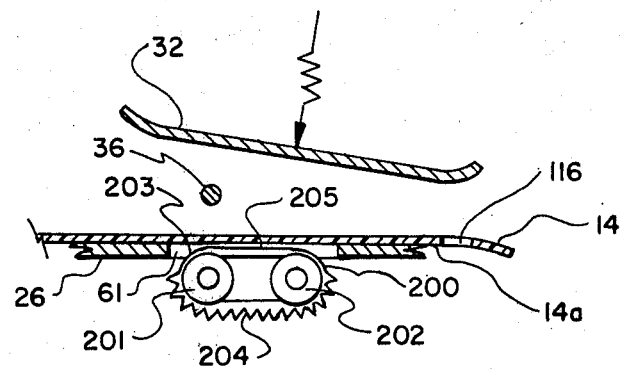
FIGS. 7 and 8 are side views of other embodiments of film threading apparatus according to the invention.
Figure 8:
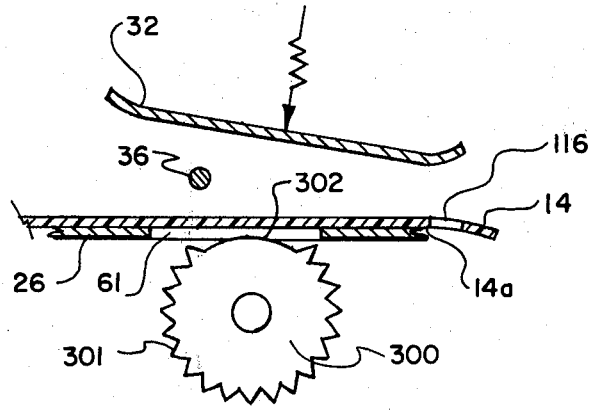

In place of the threading roller 54, it may be preferable to use one of the threading member embodiments shown in FIGS. 7 and 8. FIG. 7 depicts the threading member as an endless belt 200 which drivingly extends about an idler pulley 201 and a drive pulley 202. As is well known, the belt and the drive pulley may be constructed to mesh or interlock to effect a positive drive for the belt. The belt 200 has an outer continuous surface 203 consisting of a film engagable or threading section, which is defined by a series of teeth 204 for entering respective sprocket holes 114 along the edge portion 14a of the film leader 14, and a non-film engagable section, which is a relatively smooth portion 205, i.e., without teeth. FIG. 8 depicts the threading member as a partially toothed sprocket wheel 300 provided with series of teeth 301 for entering respective sprocket holes 114 of the film leader and with a smooth section 302 devoid of any teeth, for preventing engagement of the sprocket wheel with the film.

The invention has been described in detail with particular reference to preferred embodiments thereof, but it will be understood that variations and modifications can be effected within the spirit and scope of the invention. For example, by providing appropriate gearing between the threading roller 54 and the drive gear 96, any integral number of threading roller revolutions could be provided. Where space is a consideration, increasing the number of threading roller revolutions is advantageous because it allows the size of the threading roller to be reduced.

I claim:

1. In a photographic camera of the type having (a) a supply chamber for receiving a film cassette, (b) a take-up chamber spaced from said supply chamber, (c) a passageway between said chambers for receiving a film leader extending from the cassette, and (d) means in said take-up chamber for capturing the leader, the improvement comprising:

a film threading member having an outer continuous surface including a film engagable section and a non-film engagable section, said threading member being revolvable to alternately position its film engagable section in said passageway and its non-film engagable section opposite said passageway; and means, coupled with said threading member, for first revolving said threading member to move its film engagable section for engaging and advancing the film leader to said capturing means, and for then terminating revolution of said threading member with its non-film engagable section opposite said passageway.

2. The improvement as recited in claim 1, wherein said revolving means begins revolution of said threading member with its non-film engagable section opposite said passageway.

3. The improvement as recited in claim 2, wherein said threading member is a rotatable roller having an outer continuous surface including a film engagable section that is generally curved and a non-film engagable section that is substantially flat.

4. The improvement as recited in claim 3, wherein said passageway is partially defined by a film guide rail which restricts lateral movement of the film leader, and said roller is canted to laterally urge the leader against said rail.

5. The improvement as recited in claim 2, wherein the film leader has successively disposed sprocket holes, and said threading member is an endless belt having an outer continuous surface including a film engagable section that has a series of teeth for engaging the respective sprocket holes in the film leader and a non-film engagable section that is devoid of any teeth.

6. The improvement as recited in claim 2, wherein the film leader has successively disposed sprocket holes, and said threading member is a rotatable sprocket wheel having an outer continuous surface including a film engagable section that has a series of teeth for engaging the respective sprocket holes in the film leader and a non-film engagable section that is devoid of any teeth.

* * * * *